United States Patent [19]

Ijima

[11] 4,413,924
[45] Nov. 8, 1983

[54] BLOCKS FOR CONSTRUCTING A BREAKWATER

[75] Inventor: Takeshi Ijima, Fukuoka, Japan

[73] Assignee: Iida Kensetsu Co., Ltd., Fukuoka, Japan

[21] Appl. No.: 284,750

[22] Filed: Jul. 20, 1981

[30] Foreign Application Priority Data

Nov. 21, 1980 [JP] Japan .................... 55-164883

[51] Int. Cl.³ .............. E02B 3/06; E04B 1/02; E04C 1/08
[52] U.S. Cl. ...................... 405/31; 405/33; 52/505; 52/561
[58] Field of Search .......... 405/21, 30, 31, 33, 405/34, 35; 52/221, 503, 505, 594, 595, 561

[56] References Cited

U.S. PATENT DOCUMENTS

| | | | |
|---|---|---|---|
| 482,059 | 9/1892 | Kenway | 405/33 |
| 2,029,586 | 2/1936 | Rendoff | 52/505 |
| 2,474,786 | 6/1949 | Humphrey | 405/30 |
| 3,818,656 | 6/1974 | Vigliotti | 52/594 X |
| 4,175,888 | 11/1979 | Ijima | 405/31 |

Primary Examiner—James A. Leppink
Assistant Examiner—Nancy J. Pistel
Attorney, Agent, or Firm—Jordan and Hamburg

[57] ABSTRACT

Blocks for constructing a breakwater substantially comprises a front wall, a rear wall disposed in parallel and spaced-apart relationship relative to the front wall, and at least one partition wall disposed perpendicular to the front and rear walls and integrally connecting the above two walls to form at least one vertical open-ended chamber between the front and rear walls, wherein the improvement is characterized in that at least one vertical open-ended hole is formed on each of the front and real walls of the block such that the vertical open-ended hole can be in alignment with corresponding vertical open-ended holes formed in the same manner on front and rear walls of the blocks in upper and lower rows when the blocks are arranged in rows and stacked vertically. Due to such construction, when the blocks are stacked up in rows to form a breakwater, the breakwater can have a water receiving chamber which effects the dissipation of wave forces and elongated vertical aligned holes in the front and rear portions thereof which effect the firm integration of blocks along with the packing of block uniting material therein.

6 Claims, 12 Drawing Figures

BLOCKS FOR CONSTRUCTING A BREAKWATER

BACKGROUND OF THE INVENTION

This invention relates to blocks used for constructing a breakwater or a quay, which can effectively decrease the force of high magnitude waves while maintaining the stability of the structure thereof.

In recent years, breakwaters and quays of a type which can dissipate the energy of incident waves, thus absorbing the reflected waves and decreasing the force of the waves, have been developed.

Figure 1A:
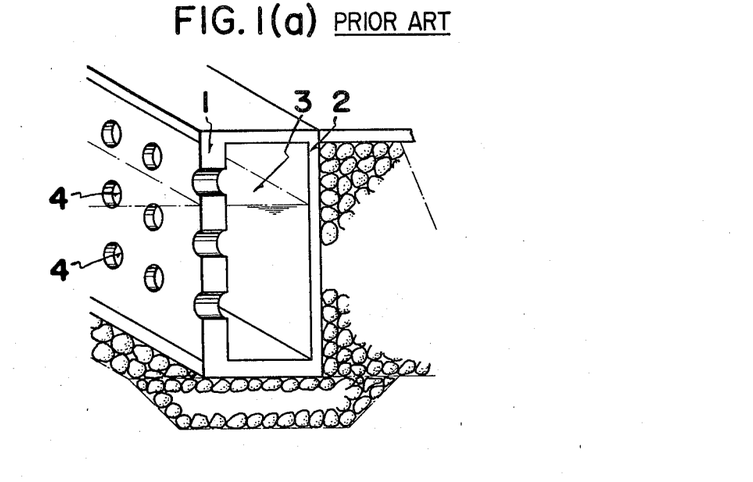
Figure 1B:
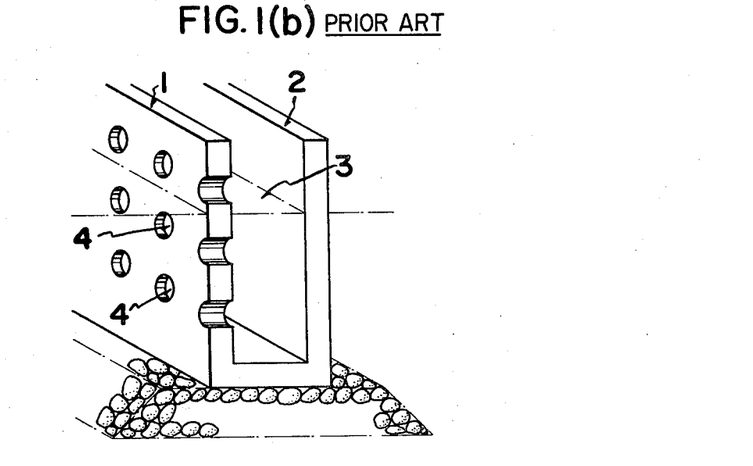

Such a breakwater and quay are shown in FIGS. 1(a) and (b), respectively, wherein each structure substantially comprises a perforated front wall 1, an unperforated rear wall 2, and a water receiving chamber (3) defined between the front and rear walls. With such a construction, the quay can dissipate the force of the waves in the following manner. Namely, when the tops of the incident waves reach the front wall 1, the water level of the incident waves at the front wall rises resulting in a sharp difference between the water level of the incident wave and the water level of the water in the water receiving chamber 3. This phenomenon subsequently results in a rushed flow of incident wave into the water receiving chamber 3 through horizontal holes 4 formed on the apertured front wall 1. Such rushed flow causes vortices in the water receiving chamber 3, thereby efficiently decreasing the wave force. Thus, the resulting swirling stream causes an energy loss of wave energy.

After a half period of wave cycle, when the water level in the water receiving chamber rises, the bottom of the wave reaches the front wall. The water rushes out through the horizontal holes 4 from the chamber 3. Such rushed flow also causes vortices and thereby the wave force is further weakened. This implies that the reflected wave is effectively absorbed by the structure maintaining the water in the harbor as calm as possible.

In a breakwater, the incident wave hits the perforated front wall 1 first. A portion of the water then imparts a primary pressure against the front wall, while the remaining water rushes into the water receiving chamber 3. Furthermore, the portion of the remainder hits the rear wall 2, imparting a secondary pressure to the wall 2. Since a mass of the incident waves hits both front and rear walls in sequence with a time lag, the impact pressure of the wave which conventional apertured breakwaters suffer can be prevented.

To install such a quay or breakwater, large-sized caissons provided with openings have been proposed and developed. However, these caissons have the following problems in view of their construction and installation and therefore few of them have been installed commercially up to this date.

(a) Since such a caisson has holes, the carrier cannot tow the caisson from the manufacturing site to the installation site. Accordingly, the installation operation requires a large-sized carrier vessel equipped with a gigantic crane, which results in expensive installation. Such a disadvantage is especially remarkable in a small-scale installation.

(b) Since the caisson which has openings cannot accommodate the packing or charging material, such a caisson is light in weight although the volume thereof is large. Therefore, this caisson lacks resistance against outer forces such as waves or earth pressures.

(c) Standardization of the caissons corresponding to the size of the installation operation is impossible.

(d) Since the caisson is in general large-sized, the manufacturing facilities also must be large in scale. The operation of such facilities is costly.

Accordingly, in recent times, a method to construct breakwaters with blocks has been proposed.

Figure 2:
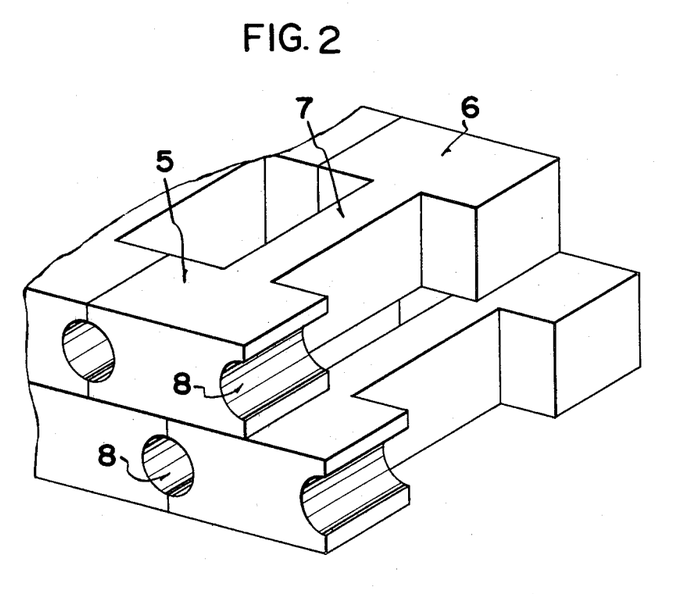
FIG. 2 is an enlarged view of the principal part of a quay or breakwater constructed by the blocks of this invention.
Figure 3A:
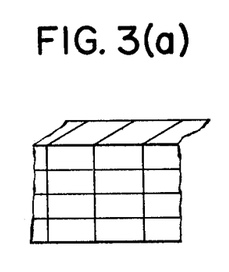
Figure 3B:
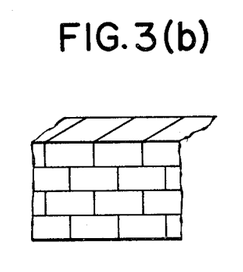

In installing such breakwater or quays, the blocks are stacked up. FIG. 2 shows a portion of a breakwater constructed with such blocks, wherein each block substantially consists of three components, namely, a front wall portion 5 forming a perforated wall of the caisson, a rear wall portion 6 forming the rear wall of the caisson, and a uniting beam 7 integrally joining both front and rear portions 5 and 6.

A quay or breakwater with seams in a staggered pattern (FIG. 2) is constructed by disposing those blocks laterally on the same horizontal level and stacking up the blocks vertically while shifting the center lines of the blocks. A quay or breakwater constructed in the above manner can provide horizontal holes 8 which correspond to the horizontal holes 4 of the caisson.

The blocks need not necessarily be stacked up in a staggered zigzag pattern. For example, the blocks may be stacked aligning the sides of all blocks on the same vertical line. However, the stacking-up of blocks in a staggered pattern is most recommendable to achieve the uniform distribution of internal stress which may be caused in the structure during the block stacking operation and sufficient uniting of blocks which will be described later. As stated above, a breakwater or the quay constructed by stacking up the blocks provides energy dissipating functions equal to those of breakwaters constructed by a large-sized caisson. However, the block-made breakwaters still have a serious structural defect. Namely, there are no structurally firm connections among the blocks similar to toy building blocks. Accordingly, such breakwater may be destroyed easily be local internal stress induced by wave force, earthquake force, or unequal ground subsidence, even if the breakwater is constructed in a staggered pattern. Such cases have actually occurred. In order to prevent such disasters and provide stable and firm construction, it is essential to structurally firmly contact the blocks with each other.

Accordingly, it is an object of the present invention to provide blocks for constructing a breakwater or quay which can be structurally firmly connected to each other, thereby providing for constructing a breakwater or quay having sufficient rigidity, integration and strength.

In summary, the present invention discloses a block for constructing a breakwater, comprising (a) a front wall, (b) a rear wall disposed in parallel and spaced-apart relationship relative to the front wall, (c) and at least one partition wall disposed perpendicularly to the front and rear walls and integrally connecting the two walls to form at least one vertical open-ended chamber between the front and rear walls, wherein the improvement is characterized in that at least one vertical open-ended hole is formed on each of the front and rear walls of the block such that the vertical open-ended hole can be in alignment with corresponding vertical open-ended holes formed in the same manner on front and rear walls of the blocks in upper and lower rows when the blocks are arranged in rows and stacked vertically.

BRIEF DESCRIPTION OF THE DRAWINGS

FIGS. 1 (a) and (b) are schematic views showing the dissipation of wave forces by a conventional quay and breakwater, respectively.

FIGS. 3 (a) and (b) are schematic views showing the manner of stacking the blocks.

FIGS. 4 (a) and (b) are each plan views, front views, and side views of two types (a) and (b) of blocks respectively.

FIGS. 5 (a) and (b) are plan views of structures constructed by the above blocks (a) and (b) respectively.

DETAILED DESCRIPTION OF THE PREFERRED EMBODIMENTS

Blocks for constructing a breakwater according to this invention are described in detail hereinafter in conjunction with the attached drawings FIG. 4 to FIG. 8.

Figure 4A:
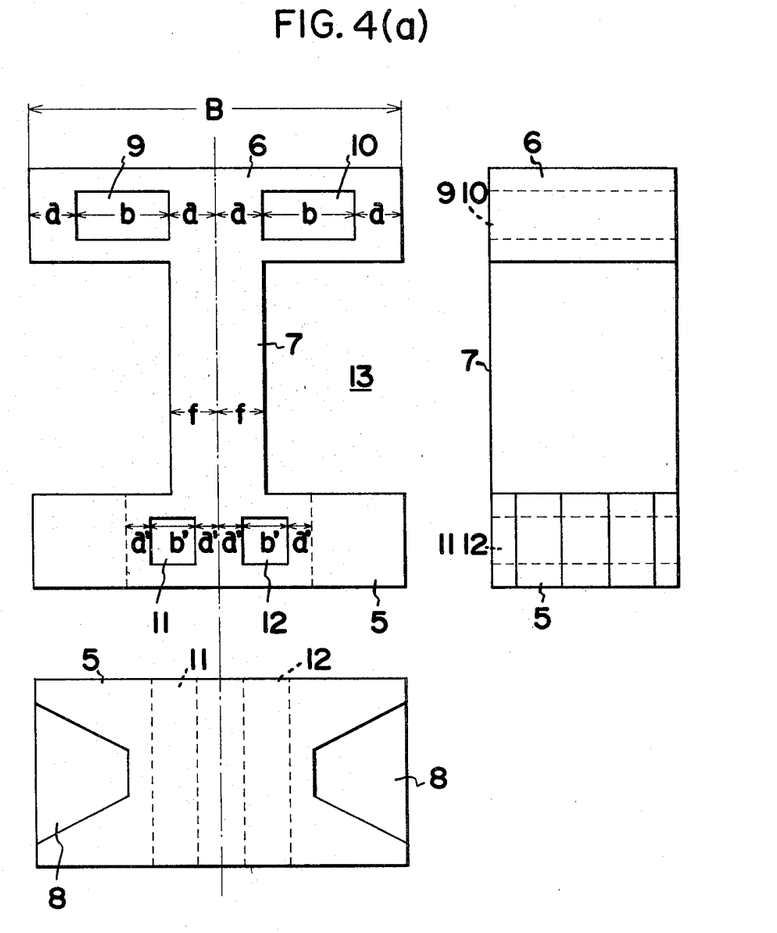
Figure 4B:
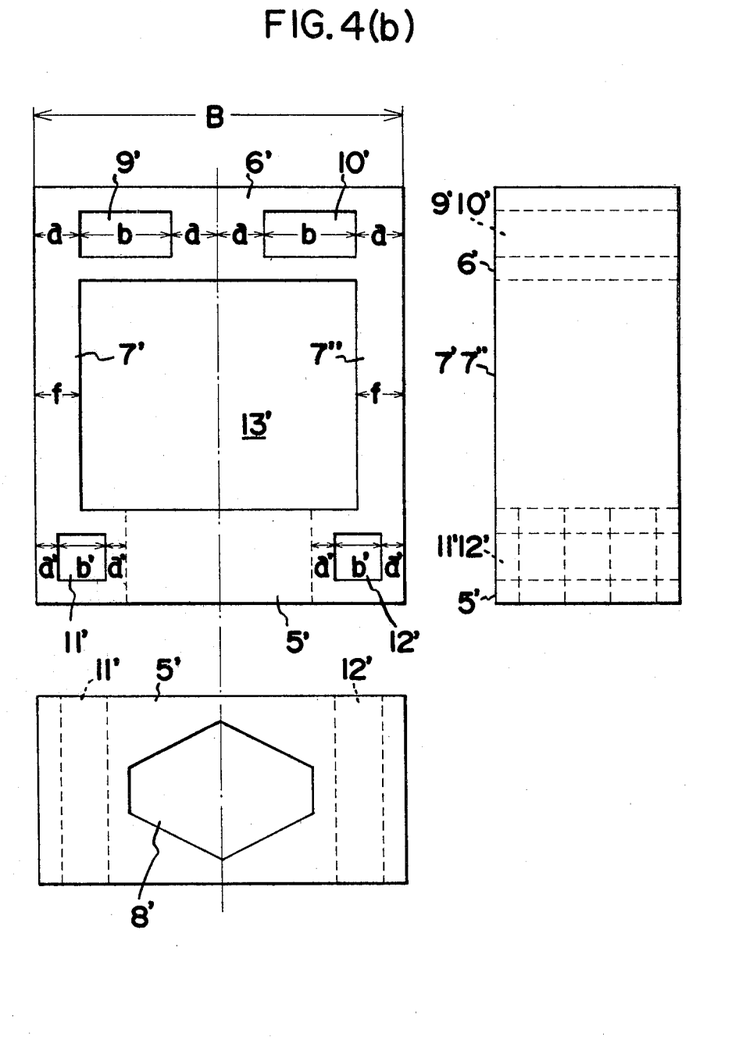

Two types of the blocks (a) and (b) are shown in FIGS. 4 (a) and (b) respectively. In these drawings, numeral 5 and 5' indicate vertical front walls, numeral 6 and 6' indicate vertical rear walls disposed behind the front walls 5, 5' in a parallel spaced-apart relationship, and numeral 7, 7' and 7" indicate connecting beams disposed perpendicular to these walls and integrally connecting these walls. Numeral 9, 10, 9' and 10' indicate a pair of vertical holes provided in the rear walls 6 and 6' respectively, while numeral 11, 12, 11', and 12' indicate another pair of vertical holes formed in the front walls 5 and 5' respectively. Numeral 8 and 8' indicate horizontal holes formed in the front walls through which the incident waves rush into water receiving chambers defined between connecting beams 7, 7 and 7', 7'.

Both blocks (a) and (b) have a symmetrical plan view with respect to a center line and the shape of the block (a) in a top view is the same as the combined left side and right side of the other block (b) in view of the center line, and vice versa.

Vertical holes in the front and rear walls have different shapes, but their position with respect to the center lines of blocks (a) and (b) are both in a symmetrical relation. Therefore, the same attributes relating to the longitudinal hole of the rear wall exist with that of the front wall.

Figure 5A:
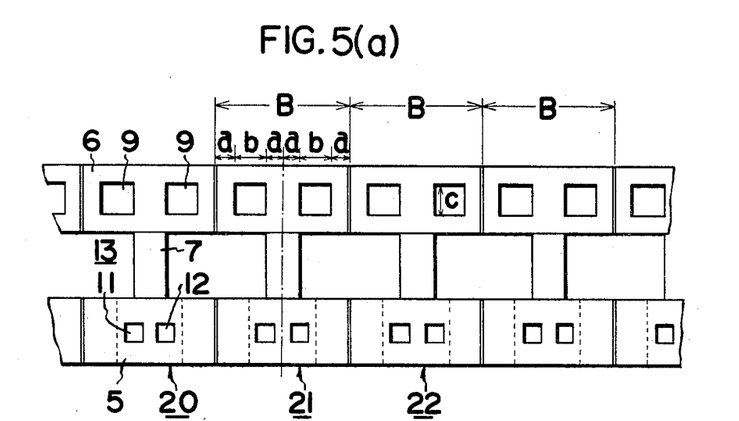
Figure 5B:
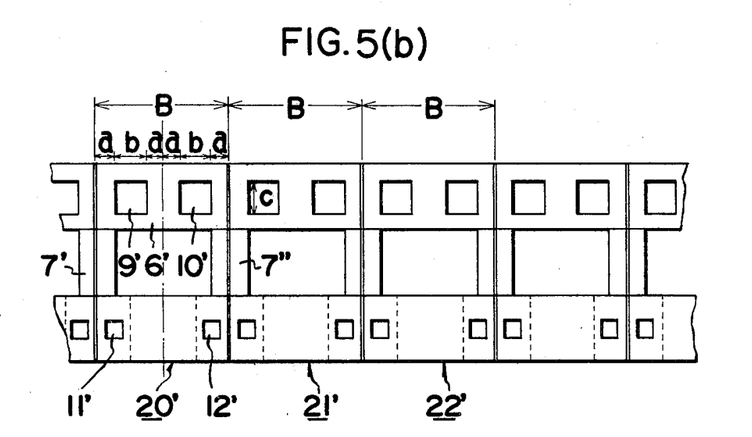
Figure 6:
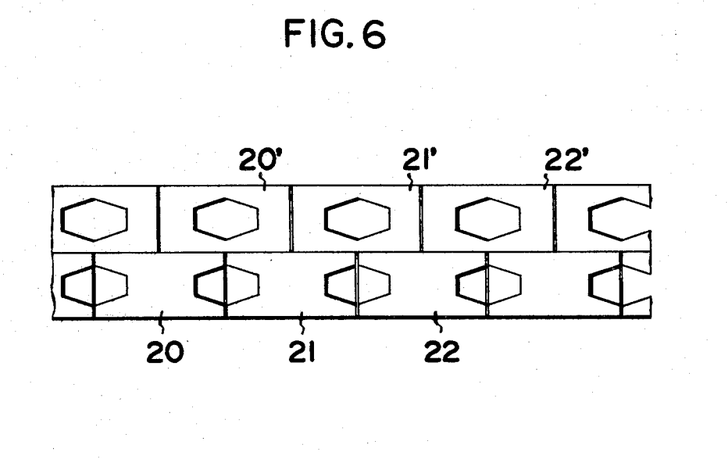
FIG. 6 is a front view of the above structure.
Figure 7:
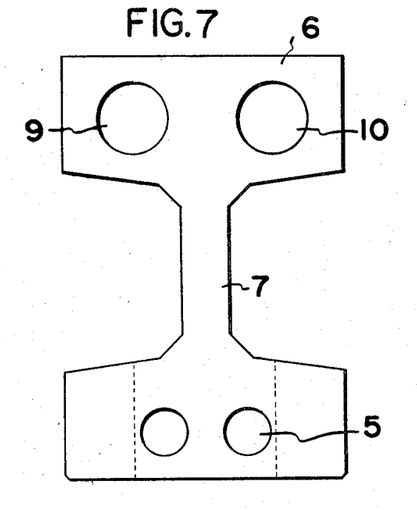
FIG. 7 and FIG. 8 are plan views of two types (a) and (b) of blocks which have round vertical holes.
Figure 8:
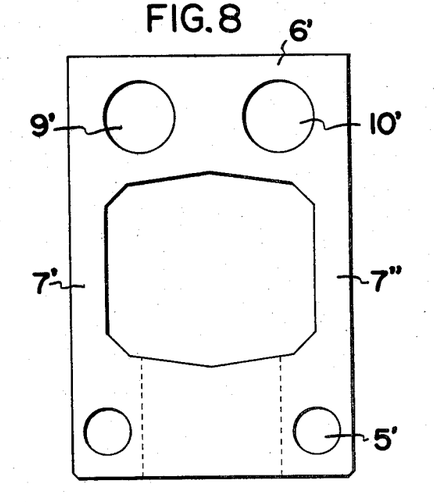

FIG. 5 shows the above blocks (a) and (b) horizontally disposed in a row respectively. The rear wall portion of each block is provided with two vertical holes 9, 9', 10, and 10' of a length (c) and a width (b) which are symmetrical with respect to the center line. The width (b) of the hole is arbitrary. Distances to the right and left sides of the hole from the center line of the block and from the sides of the block are equal and represented by (a).

The hole is denoted by a square in FIG. 5, but can be in any shape provided that the shape is symmetrical with respect to a center line of the hole. It may be taken into consideration that the hole is tapered longitudinally (vertically) to make it easy to remove the blocks from the molds during manufacture of the blocks. The number of the vertical holes formed in each block is not limited to two. However, two holes are the most convenient for constructing a breakwater.

When the blocks (a) and (b) provided with such vertical holes are stacked up, as readily understood from FIG. 5, the vertical holes in the blocks (a) of the first row align with the vertical holes formed in the blocks (b) of the second row, and thus provide elongated continuous holes in the stacked rear walls. What is especially important in the above stacking is that the right-side vertical hole of the block 21 in the first row aligns with the right-side vertical hole of the block 20' in the second row, and the right-side vertical hole of the block 21 in the first row aligns with the left-side vertical hole of the block 21' in the second row.

Namely, the vertical holes of a block in a row must always align with one of the vertical holes of the two adjacent blocks in the upper and lower rows. The same goes for the vertical holes 11, 11', 12, and 12' formed in the front walls.

After the stacking operation, a suitable filler such as cobble stones and concrete or ferro-concrete is charged into the above mentioned elongated continuous upright hole made of a plurality of vertical holes formed in the front and rear of the blocks in each row. The fillers serve as rigid and solid upright posts which vertically go through the front and rear wall of the breakwater or quay.

Therefore, all blocks are, horizontally as well as vertically, united and integrated firmly by the solid upright posts, enabling the construction of a breakwater or a quay of sufficient rigidity, and integration, the strength which is able to resist a high magnitude of wave force, ground pressure, or an earthquake.

As has been described heretofore, the block for constructing a breakwater or a quay according to the present invention and the breakwater or the quay constructed by the blocks provide the following advantages.

(1) Facilitates construction and provides a highly integrated structure.

(2) Provides high reliability in construction because the concrete as a filler does not flow out of the elongated continuous upright holes which go through the blocks during the concrete pouring operation.

(3) Makes no difference in forms between single block type manufacturing and two block types manufacturing because each of two types is symmetrical with respect to a center line and has a shape obtainable by exchanging the right sides and left sides.

(4) Withstands large horizontal and vertical pressures at the breakwater due to the highly reliable front wall and rear wall, each firmly united vertically by means of the longitudinal holes. This is because all blocks used are structurally firmly connected at both their front and rear portions.

What we claim is:

1. Blocks for constructing a breakwater, each of said blocks having a front wall and a rear wall, said rear wall being in parallel and spaced-apart relationship relative to said front wall, at least one partition wall disposed perpendicular to said front and rear walls and integrally connecting said front and rear walls to form at least a half portion of a vertical open-ended chamber between said front and rear walls, at least a half portion of a horizontal hole formed in said front wall, each of said blocks having at least a left and a right vertical open-ended hole formed in one of said front or rear walls, said blocks being disposed in generally horizontal rows with abutting joints with at least one row overlying another row and with the center-line of a block in said one row being generally vertically aligned with the abutting joint of two blocks in said other row, said blocks in said one row having their left and right open-ended holes each spaced from the respective block center-line a first distance, said blocks in said other row having their open-ended holes each spaced from the respective block center-line a second distance, said first distance being different from said second distance such that the left hole in one block in said one row is generally vertically aligned with the right hole in a second block in said other row and the right hole in said one block in said one row is generally vertically aligned with the left hole in a third block in said other row in which said second and third blocks generally abut one another along an abutting plane which generally bisects said first block, whereby a plurality of rows of blocks may be stacked on one another to form said breakwater with the vertical abutting joints between the blocks in said one row being horizontally displaced relative to the vertical abutting joints of said blocks in said other row and with said vertical open-ended holes in overlying blocks being vertically aligned and thereby adapted to receive a material for providing vertical structural support to said breakwater.

2. Blocks for constructing a breakwater according to claim 1, wherein said material for providing vertical structural strength is concrete.

3. Blocks for constructing a breakwater according to claim 1, wherein said blocks in said one row each have one partition wall and said vertical open-ended chamber is defined by combining said half portions formed on either side of said partition wall with half portions formed on either side of a partition wall of an abutting block of the same construction disposed in said one row, each of said blocks in said other row each having a pair of spaced-apart partition walls and said vertical open-ended chamber is formed between said pair of spaced-apart partition walls.

4. Blocks for constructing a breakwater according to claim 3, wherein said front wall of said blocks in said one row each have a half portion of a horizontal hole which mates with a corresponding half portion of a horizontal hole in the front wall of an adjacent block in said one row to define a completed horizontal hole, said front walls of said blocks in said other row each having a complete horizontal hole.

5. Blocks for constructing a breakwater according to claim 1, where said left and right open-ended holes are formed in said front wall, and further comprising at least one vertical open-ended hole formed in the rear wall of each of said blocks.

6. Blocks for constructing a breakwater according to claim 5, wherein there are a pair of vertical open-ended holes formed in the rear wall of each of said blocks, each of said pair of vertical open-ended holes being equally spaced from the center-line of the respective block a third distance, each of said pair of vertical open-ended holes being spaced from the ends of the block a fourth distance, said third distance being equal to said fourth distance so that the vertical open-ended holes formed in said rear wall are generally vertically aligned and thereby adapted to receive a material for providing vertical structural support to said breakwater.

* * * * *